United States Patent [19]
Thatcher

[11] 3,928,919
[45] Dec. 30, 1975

[54] WELDING TRACK POSITIONING GAUGE

[76] Inventor: Russell S. Thatcher, 813 Sidnor, Alvin, Tex. 77511

[22] Filed: Apr. 25, 1975

[21] Appl. No.: 571,777

[52] U.S. Cl. .............................. 33/180 R; 29/464
[51] Int. Cl.² ............................................ G01B 3/38
[58] Field of Search .......... 33/180 A, 181 A, 168 R, 33/168 B; 29/60 A, 464

[56] References Cited
UNITED STATES PATENTS

| | | | |
|---|---|---|---|
| 2,815,582 | 12/1957 | Karstenss | 33/180 R |
| 2,840,920 | 7/1958 | Clifton | 33/84 X |
| 3,380,148 | 4/1968 | Nelson et al. | 29/464 |
| 3,733,706 | 5/1973 | Blohm | 33/180 R |

Primary Examiner—William D. Martin, Jr.
Attorney, Agent, or Firm—Arnold, White & Durkee

[57] ABSTRACT

A positioning gauge for fitting into a seam formed between the edges of two articles to be joined by welding and for precisely locating a track suitable for carrying a welding machine with respect to the seam. The positioning gauge comprises a flexible cable having a plurality of positioning blocks attached to it and a latch connected to the ends of the cable for securely attaching the gauge around the workpiece. The positioning blocks contain a gauge block of predetermined thickness for precisely spacing the track parallel to the seam, a clamp assembly for attaching the positioning block to the cable, and a spacing member for adjusting the exact location of the track.

5 Claims, 7 Drawing Figures

WELDING TRACK POSITIONING GAUGE

BACKGROUND OF THE INVENTION

This invention relates generally to a novel positioning gauge for the welding industry. More particularly, this invention concerns a positioning gauge comprised of a plurality of positioning blocks fitted into the seam to be welded and connected to a flexible cable which is latched into place around a workpiece. The welding machine track is then located adjacent the positioning blocks and thus, properly spaced from the seam.

In the past in automatic welding operations it has been common to utilize a welding machine track attached directly to the workpiece to provide a path or bed upon which the welding machine travels as it makes its weld around the circumference of the workpiece. It is necessary in such welding operations that the track be positioned a precise distance from and parallel to the seam in order that the electrode of the welding machine be properly located. The welding track is often heavy and difficult to manipulate, thus positioning it has been a persistent problem in the welding industry. In the past, the welding track has been positioned by simple trial and error methods or the use of a rigid split ring or band. The trial and error method is time consuming, costly and produces results that are not uniform for all joints. The use of a rigid band for positioning the track presents problems of storage and handling when not in use, and inaccurate and unacceptable results due to deformation of the rigid band caused by the rugged field conditions which exists in the welding industry. Both existing methods require skilled or semi-skilled labor to install the welding machine track since experience is required for the trial-and-error method or sophisticated adjustments have to be made to the split ring device.

Recognizing the need for an improved positioning gauge it would, therefore, be desirable to provide a lightweight, easily stored and rugged gauge for positioning the welding track.

Positioning bands and gauges have been employed for an extended period of time as depicted in U.S. Pat. No. 3,380,148 to Nelson, and U.S. Pat. No. 3,800,116 to Tanaka. The positioning apparatus disclosed in the Tanaka U.S. Pat. No. 3,800,116, in using magnets to maintain the spacers in position, appears to lack stability of the magnet gauge. In the event of a side load being imposed on the gauge prior to the band being placed in position, the gauge may be displaced from its preferred location and not function properly to guide the track into position.

One feature of the present invention is a novel positioning gauge which is capable of precisely locating a welding machine track parallel to and a fixed distance from the seam to be welded.

A further feature of the present invention lies in providing a positioning gauge that can be quickly and accurately secured to the workpiece by unskilled labor without having to make delicate adjustments.

Yet another feature of the invention is to provide a positioning gauge that can withstand the rugged treatment experienced in field welding operations.

Still another feature of the invention is to provide a positioning gauge that is lightweight and easily manipulated by only one or two people.

Yet still another feature of the invention is to provide a positioning gauge that can be compactly stored without becoming bent or deformed.

SUMMARY OF A PREFERRED EMBODIMENT OF THE INVENTION

A positioning gauge according to a preferred embodiment of the invention includes a flexible cable circumferentially fitted about a workpiece. A plurality of positioning blocks are spaced along and attached to the cable which is looped around the workpiece and fastened securely to it by a latch mechanism connected to the ends of the cable. The positioning block is composed of a gauge block of a predetermined thickness for spacing the track a fixed distance from the seam, a spacing member for properly aligning the blocks, and a clamp assembly for attaching the positioning block to the cable.

BRIEF DESCRIPTION OF THE DRAWINGS

So that the present invention may be understood in detail, a more particular description of the invention may be had by reference to the illustrative embodiments shown in the appended drawings, which form a part of this specification. It is to be noted, however, that the drawings illustrate only a typical embodiment of the invention and is not to be considered limiting of its scope, for the invention may admit to other equally effective embodiments.

IN THE DRAWINGS

Figure 1:
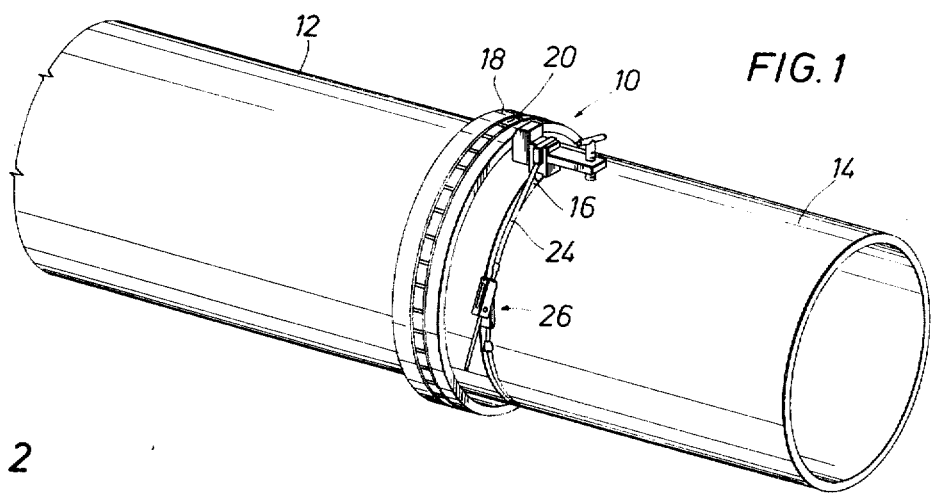

FIG. 1 is a perspective view of the positioning gauge affixed about a cylindrical workpiece and which embodies the features of this invention.

Figure 2:
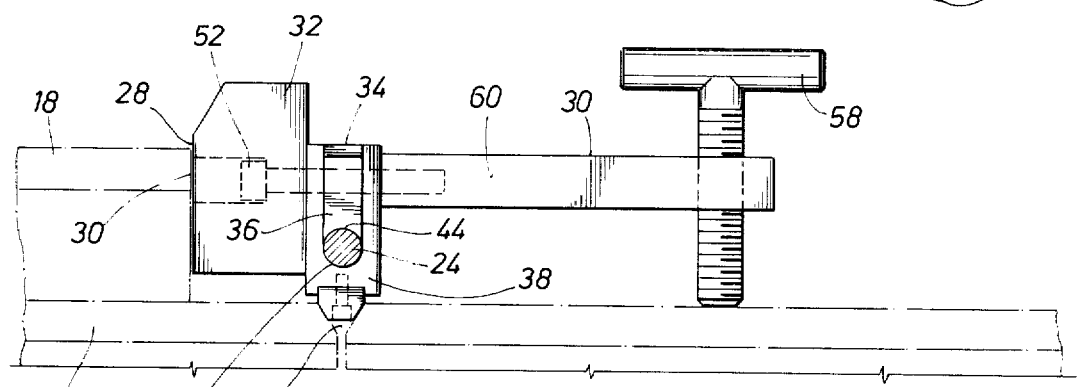

FIG. 2 is a detailed elevation view of a positioning block in place in the seam to be welded.

Figure 3:
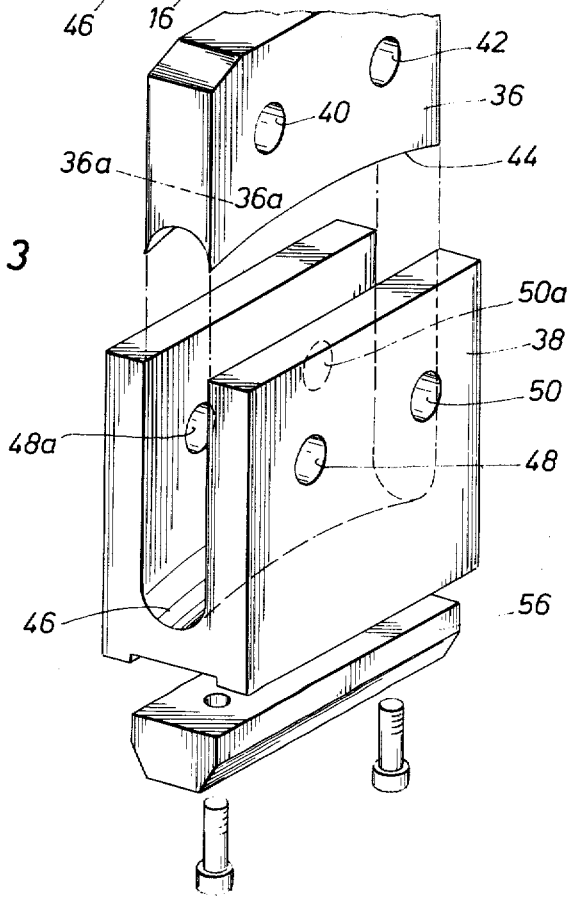

FIG. 3 is a detailed perspective view of the clamp assembly.

Figure 4:
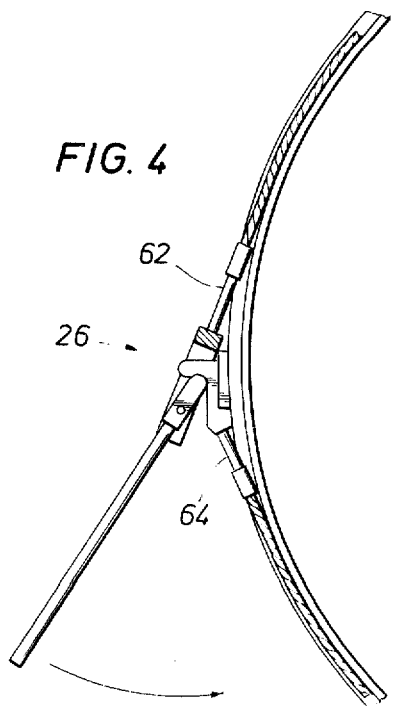

FIG. 4 is a perspective view of the latch mechanism.

Figure 5:
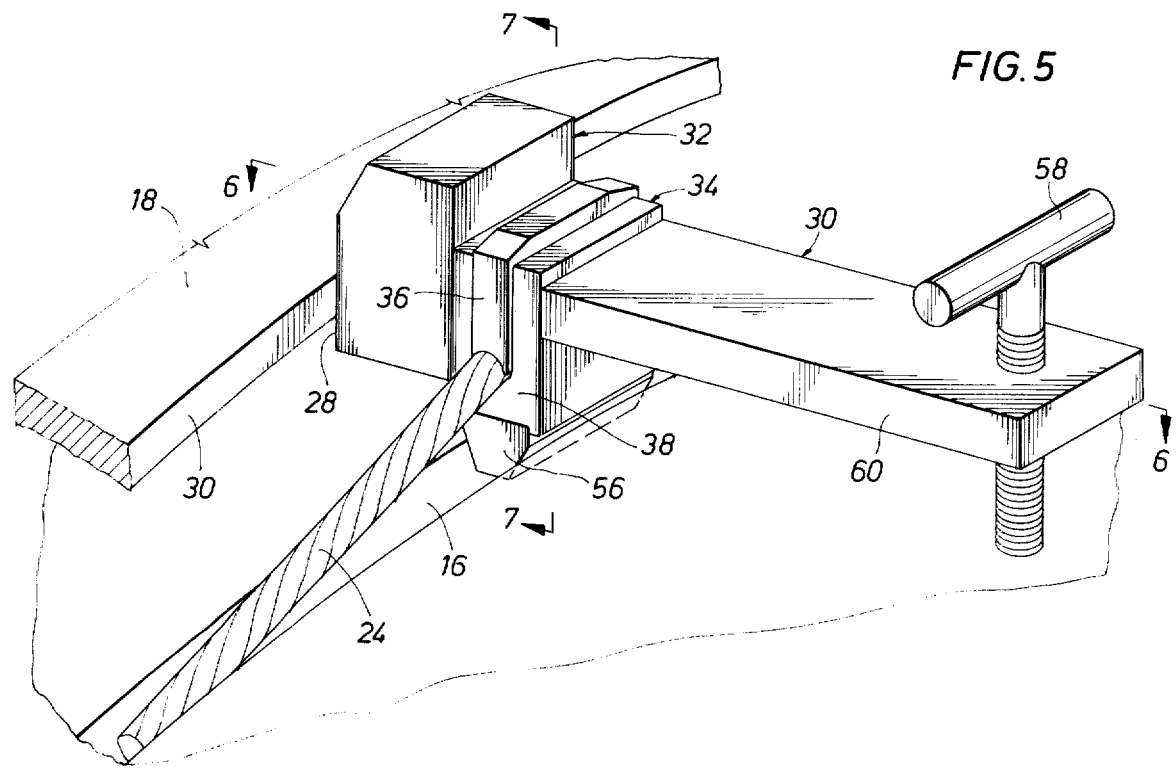

FIG. 5 is a detailed perspective view of a positioning block in place in the seam to be welded.

Figure 6:
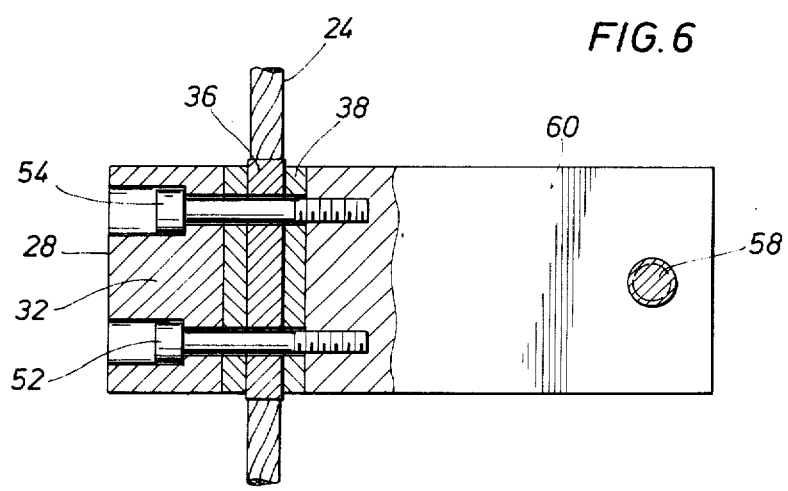

FIG. 6 is a partial sectional view of a positioning block.

Figure 7:
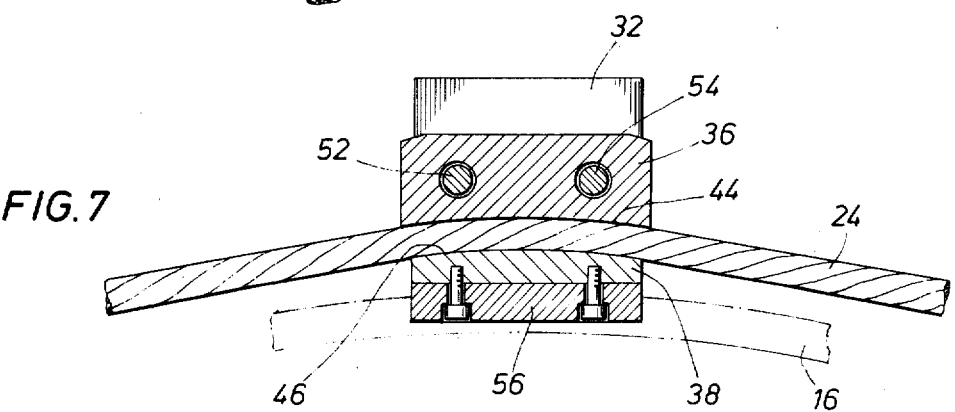

FIG. 7 is an end view, partially in cross-section, of a positioning block.

DETAILED DESCRIPTION OF THE PREFERRED EMBODIMENT OF THE INVENTION

In FIG. 1 there is illustrated the positioning gauge, shown generally at 10, mounted on a workpiece such as pipe sections 12 and 14. These pipe sections are held in proper end-to-end position and alignment by clamps, bars, tack welds or any of several known methods of positioning the sections to be permanently joined by the welding operation. The ends of the pipe sections 12 and 14 form a groove or seam 16, at which location the weld is made so as to join the two pipes.

When a conventional automatic welding machine is to be employed to perform a girth weld on pipe sections, it is convenient to employ a guide mechanism such as track 18, which may be circumferentially attached to one section of the pipe 12. To position the electrode of the welding machine precisely with respect to the seam 16, the welding machine must be placed at an accurately determinable position with respect to the seam. Track 18 typically contains a rack 20 which is engaged by a driven sprocket mounted on the welding carriage which propels the welding machine along the track and, thus, around the circumference of the pipe as the weld is formed. A plurality of positioning blocks 22 are fitted into the groove 16 formed by the abutting pipe sections 12 and 14 at spaced points along the pipe circumference. The positioning blocks 22 are held in place by a flexible cable 24 passing through cable assembly 34 of each block 22, said cable forming a closed loop or girth around the exterior surface of the pipe. See FIG. 5. The ends of cable 24 are connected one to the other by a latch mechanism shown generally at 26.

Referring to FIGS. 2 and 5, positioning blocks 22 are spaced about the circumference of the pipe and partially fitted into the seam 16 formed by the abutting pipe sections. When positioning blocks 22 are properly fitted over the groove 16, the flat end surfaces 28 of positioning blocks 22 describe a plane normal to the surface of the workpiece. This plane is perpendicular to the longitudinal axis of the pipe and parallel to and a fixed distance from the seam 16. The welding machine track 18 is then mounted around the pipe 12 and positioned such that its edge surface 30 contacts the end surface 28 of each of the positioning blocks 22. When the track 18 has been firmly secured into position by its own latch mechanism, the entire positioning gauge 10 is removed from the pipe and taken to the next seam to be welded.

Turning again to the drawing in FIGS. 2 and 5, there is illustrated a detailed representation of the positioning block 22 of the positioning gauge 10 as it is fitted into the seam 16. Block 22 is composed of three sections; first, an adjusting arm 30 for stabilizing the positioning gauge in a direction transverse the plane of the circumferential seam; a gauge block 32, for spacing a track a predetermined distance from seam 16; and a clamp assembly shown generally at 34.

With reference to FIGS. 3 and 7, it can be seen that the clamp assembly 34 has an upper clamp block 36 and a clevis-shaped lower clamp block 38, which lower clamp block 38 has a joint insert 56 attached to the bottom portion thereof. Upper clamp block 36 contains a plurality of apertures 40, 42 through its central portion and an arcuate lower surface 44 which contacts flexible cable 24. The arcuate lower surface 44 is formed with a suitable radius, (For example, about 3 inches) circumscribing an arc the width of upper clamp block 36. The surface is curvate in shape with respect to axis 36a–36a of FIG. 3 so as to accommodate cable 24 and engage the exterior surface of cable 24 for maximum surface frictional contact between lower clamp block 38, upper clamp block 36 and cable 24. Lower clamp block 38 is constructed with an inner arcuate surface 46 formed along its lower portion as well as having a plurality of apertures 48, 50 through its upper portion. The respective apertures of the upper and lower clamp blocks align one with another, that is aperture 42 aligns with aperture 50 and its corresponding aperture 50a opposite aperture 50 and likewise aperture 48 aligns with aperture 40 and the corresponding opposite aperture 48a, said apertures for receiving a bolt therethrough for clamping the clamp blocks about cable 24.

In attaching positioning block 22 to flexible cable 24, the cable is placed within the lower clamp block 38 along the inner arcuate surface 46. See FIGS. 2 and 7. The upper clamp block 36 is then fitted within the lower clamp block 38 such that the cable 24 is compressed between the arcuate surfaces 44 and 46. As seen in FIG. 5, this compression urges that portion of cable 24 between the positioning blocks 22 inward into the seam 16 providing for a more efficient installation and positive engagement. When compression sufficient to hold the cable 24 in place is obtained by forcing the upper clamp block 36 against the flexible cable 24 and the lower clamp block 38, the holes 40 and 42 of the upper clamp block 36 are in alignment with the holes 48 and 50 of the lower clamp block enabling the insertion of bolts 52 and 54 through the gauge block 32. See FIG. 6. The bolts 52 and 54 prevent any relative movement of clamp blocks 36 and 38 after the cable 24 has been compressed, thus maintaining the positioning block 22 firmly secured to the cable 24.

As seen in FIGS. 2 and 5, the clamp assembly 34 and cable 24 are aligned directly above seam 16 such that joint insert 56, connected to the lower portion of the lower clamp block 38, is fitted into the seam 16. The joint insert 56 may be V-shaped as shown or semi-circular shaped such that it can be inserted into a seam 16 of varying dimensions. Since the joint insert 56 is aligned directly beneath the flexible cable 24, insert 56 and the portions of the cable between the positioning blocks are forced into seam 16 as the cable is tightened about the workpiece. This positively secures the positioning block 22 and enables the positioning gauge 10 to support and align a welding machine track 18 in proper position with respect to seam 16 so the track can be tightened about the workpiece.

One extremity of the positioning block 22 is composed of a gauge block 32 attached to the clamp assembly 34. Referring to FIG. 6, this attachment may be by means such as bolts 52 and 54 which extend through a portion of gauge block 32, clamp blocks 36 and 38 and is secured into internal threads provided in arm 60. The gauge block 32 is of a predetermined thickness such that when the track 18 contacts or abuts the flat surface 28 of the gauge block 32, the track will be located at a precise distance from the center of seam 16. This distance is equal to the distance from the flat surface 28 to the center of joint insert 56. Since it may be necessary to adjust this fixed distance depending upon the type of welding equipment utilized, the gauge block 32 can be easily replaced by removing the bolts 52 and 54 and inserting a gauge block of different thickness. Although the gauge block 32 of FIG. 2 is essentially rectangular in shape, it will be appreciated that the block can be of various shapes and sizes in order to accommodate the particular track to be positioned and the amount of space available in which to perform the work.

The end of the positioning block 22 opposite the gauge block 32 is composed of a spacing member shown generally at 30 in FIGS. 2 and 5. The spacing member 30 is, as previously mentioned, attached to the clamp assembly 34 by bolts 52 and 54 inserted into gauge block 32 and passing through the clamp assembly 34. The spacing member 30 is composed of an adjusting screw 58 having external threading and arm 60 having internal threading through an aperture of an arm 60, said aperture spaced apart from said gauge block 32. Since one end of the adjusting screw contacts the surface of the workpiece, the angular orientation of the arm 60 and thus the entire positioning block 22, with respect to the surface of the workpiece can be adjusted by manually turning the adjusting screw 58. Adjustment of the positioning block 22 is required in order to insure that the plane formed by the flat surfaces 28 of the individual positioning blocks 22 are parallel to the plane through the seam to be welded.

When the positioning block 22 has been properly located, the ends of the cable 24 are brought together and connected by the latch mechanism 26. The latch 26, as depicted in FIG. 4, is a conventional overcenter lock type latch but it will be appreciated that any type of toggle or quick release latch can be employed. The latch 26 is connected to the cable by two threaded adjusting rods 62 and 64, each having one end welded to the cable 24 and its opposite end threaded into the latch 26. These threaded rods 62 and 64 make it possible to easily adjust the tightness and fit of the cable around different size workpieces.

Thus, it is apparent that there has been provided in accordance with the invention, a positioning gauge for use with a welding machine track that substantially satisfies the features and advantages set forth above. Although the present invention has been described in conjunction with specific forms thereof, it is evident that many alternatives, modifications and variations will be apparent to those skilled in the art in light of the foregoing disclosure of the invention. Accordingly, it is intended that such alternatives, modifications and variations may fall within the spirit and scope of the invention as defined in the appended claims be embraced thereby.

What is claimed is:

1. A positioning gauge for fitting into a seam about a workpiece to be welded and precisely locating a welding machine track adjacent thereto, comprising:
   a flexible cable with first and second ends, said cable being externally fitted about the workpiece;
   a plurality of positioning blocks attached to said cable and radially spaced apart about said cable, each of said blocks including:
   a manually adjustable spacing member;
   a gauge block opposite said spacing member, said gauge block being a predetermined thickness for spacing said welding machine track a fixed distance from the seam to be welded;
   a clamp assembly for engaging said cable and urging said cable into firm contact with said workpiece, said positioning blocks adapted to fit within said seam for rigidly positioning said positioning block with respect to said track; and
   a latch mechanism affixed to said first and second ends of said cable, said latch mechanism having an overcenter lock for securing said cable to the workpiece.

2. A positioning gauge for fitting into a seam and locating a welding machine track as recited in claim 1, wherein said clamp assembly includes:
   an upper clamp block, said upper clamp block having an arcuate lower surface; and
   a lower clamp block engaging said upper clamp block, said lower clamp block being substantially clevis-shaped and having an arcuate inner surface with said cable passing through said clamp assembly and contacting the arcuate surfaces of said upper clamp block and said lower clamp block.

3. A positioning gauge for fitting into a seam and locating a welding machine track as recited in claim 1, wherein said spacing member includes:
   an arm attached to said clamp assembly, said arm having a threaded aperture in one extremity; and
   an adjusting screw threadedly engaging said threaded aperture of said arm and having one extremity contacting the surface of the workpiece.

4. A positioning gauge for fitting into a seam and locating a welding machine track as recited in claim 1, wherein said latch mechanism includes an adjusting rod, said rod having a threaded end connected to the overcenter lock and a welded end connected to said second end of said cable.

5. A positioning gauge for locating a welding machine track about a pipe section and adjacent a seam to be welded, comprising:
   a flexible cable with first and second ends, said cable being partially fitted into said seam and circumferentially mounted about the workpiece;
   a plurality of positioning blocks attached to said cable, each of said blocks including;
   an upper clamp block, said upper clamp block having a concave arcuate lower surface;
   a lower clamp block engaging said upper clamp block, said lower clamp block being substantially U-shaped and having a concave arcuate inner surface with said cable passing through said lower clamp block and said cable being compressed between the arcuate surfaces of said upper and lower clamp blocks;
   an arm attached to said lower clamp block;
   an adjusting screw operably connected to said arm and having one extremity contacting said workpiece;
   a gauge block attached to said lower clamp block opposite said arm, said gauge block being a predetermined thickness for spacing said track a fixed distance from the seam;
   a latch mechanism affixed to said first and second ends of said cable, said latch mechanism adapted for adjusting fitting said positioning gauge about said workpiece.

* * * * *